H. J. MORRISON.
CORN PLANTER.
APPLICATION FILED APR. 8, 1916.
1,193,811.
Patented Aug. 8, 1916.
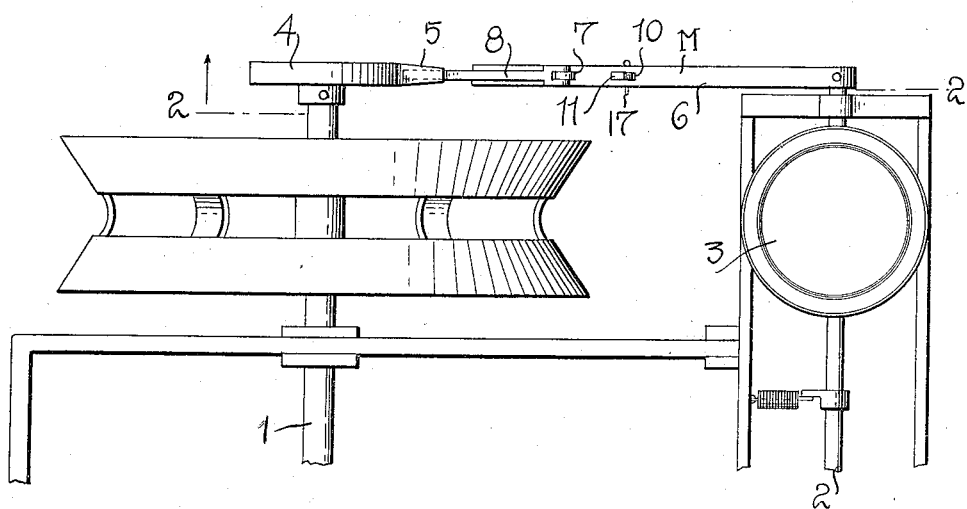
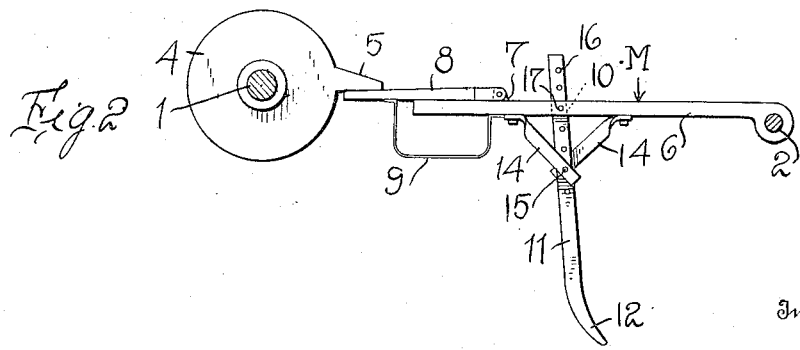
Inventor
H. J. MORRISON
By Watson E. Coleman
Attorney

UNITED STATES PATENT OFFICE.

HERMAN J. MORRISON, OF CASCADE, IOWA.

CORN-PLANTER.

1,193,811.  Specification of Letters Patent.  Patented Aug. 8, 1916.

Application filed April 8, 1916. Serial No. 89,950.

*To all whom it may concern:*

Be it known that I, HERMAN J. MORRISON, a citizen of the United States, residing at Cascade, in the county of Dubuque and State of Iowa, have invented certain new and useful Improvements in Corn-Planters, of which the following is a specification, reference being had to the accompanying drawings.

This invention relates to certain improvements in corn planters and it is an object of the invention to provide a device of this general character with novel and improved means whereby the dropping mechanism may be readily and effectively operated by a supporting shaft of the planter.

Furthermore it is an object of the invention to provide a novel and improved operating means for the dropping mechanism of the planter including a rock arm provided with a ground marking implement.

The invention consists in the details of construction and in the combination and arrangement of the several parts of my improved planter whereby certain important advantages are attained and the device is rendered simpler, less expensive and otherwise more convenient and advantageous for use, all as will be hereinafter more fully set forth.

The novel features of the invention will hereinafter be definitely claimed.

In order that my invention may be the better understood, I will now proceed to described the same with reference to the accompanying drawings, wherein—

Figure 1 is a fragmentary view in top plan of a planter illustrating an embodiment of my invention applied thereto; and Fig. 2 is a view substantially on the line 2—2 of Fig. 1 looking in the direction of the arrow.

As disclosed in the accompanying drawings, 1 denotes the supporting axle of a corn planter and 2 indicates an operating shaft for the dropping mechanism of the seed box 3. As the dropping mechanism may be of any ordinary or preferred construction it is thought that a detail description and illustration thereof is unnecessary.

The axle 1 extends beyond a side of the planter proper and to said extended portion is affixed the disk or wheel provided with the radiating trip finger 5 adapted to coact with the operating member M operatively engaged with the shaft 2.

As herein disclosed, the operating member M comprises a rock arm 6 affixed to the shaft 2 and extending inwardly toward the axle 1. The inner end of the rock arm 6 is provided with the upstanding perforate ear 7 with which is pivotally engaged the arm 8 adapted for swinging movement in a vertical plane, and it is to be noted that the ear 7 is positioned a predetermined distance inwardly of the free end of the arm 6 so that downward movement of the arm 8 relative to the arm 6 is limited and so that contact of the trip finger 5 of the disk or wheel 4 will serve to force the arm 6 downwardly in order to properly operate the dropping mechanism.

By having the arm 8 pivotally engaged with the arm 6, it will be perceived that upon rearward rotation of the disk or wheel 4 the pivoted arm 8 will permit the trip finger 5 to pass upwardly without imparting rocking movement to the shaft 2.

The arm 8 is normally maintained at the limit of its downward movement or in contact with the arm 6 through the medium of the spring member 9 herein disclosed as substantially U-shape in form and having one extremity secured to the arm 8 at a point in advance of the arm 6, while its opposite extremity is secured to the arm 6 at a point inwardly of the arm 8.

At a predetermined point intermediate its length the arm 6 is provided with a vertical opening 10 through which is extended the marking implement 11 having its lower extremity 12 arranged on a predetermined curvature. Depending from the arm 6 at a point in advance of and to the rear of the opening 10 are the depending straps 14 arranged on such inclinations as to overlie the opposite sides of the marking implement 11, the free extremities of said straps 14 having inserted therethrough a retaining pin 15 which is also adapted to be disposed through one of the longitudinally spaced series of openings 16 produced in the marking implement 11. By this arrangement it will be perceived that the marking implement 11 may be vertically adjusted in order to penetrate the ground a predetermined depth in accordance with the condition of the soil. It will also be observed that the marking implement 11 will be caused to engage the ground only when the arm 6 has been forced downwardly to operate the dropping mechanism. A pin 17 is also directed through the arm 6 and one of the openings 16 in order to further assure the maintenance of the marking implement 11 in its desired adjustment.

From the foregoing description, it is thought to be obvious that a planter constructed in accordance with my invention is of an extremely simple and comparatively inexpensive nature and is particularly well adapted for use by reason of the convenience and facility with which it may be assembled, and it will also be obvious that my invention is susceptible of some change and modification without material departure from the principles and spirit thereof and for this reason I do not wish to be understood as limiting myself to the precise arrangement and formation of the several parts herein shown in carrying out my invention in practice.

I claim:

1. In combination with the operating shaft of the dropping mechanism of a planter, a disk rotatably supported by the planter and provided with a trip finger, a rock arm engaged with the shaft, a second arm pivotally engaged with the upper face of the rock arm at a point inwardly of its free end, said second named arm extending in advance of the free end of the rock arm and adapted to be engaged by the trip finger of the disk, and a spring for normally holding the intermediate portion of the second named arm in contact with the upper surface of the rock arm, said spring being substantially U-shape in form and having one extremity secured to the second named arm at a point in advance of the first named arm and having its opposite extremity secured to the first named arm at a point inwardly of the outer end thereof.

2. In a planter, the combination with the operating shaft of the dropping mechanism, a movable trip carried by the planter, a rock arm secured to the shaft and adapted to be engaged by the trip, said rock arm being provided with a vertically directed opening intermediate the length thereof, a ground marking implement disposed through the opening of the rock arm, and means adjustably coacting with the ground marking implement for holding the same against movement independently of the rock arm, the movable trip serving to force the rock arm in a direction toward the ground.

In testimony whereof I hereunto affix my signature in the presence of two witnesses.

HERMAN J. MORRISON.

Witnesses:
C. F. CRAWFORD,
M. F. KURT.

Copies of this patent may be obtained for five cents each, by addressing the "Commissioner of Patents, Washington, D. C."